United States Patent [19]

Shen et al.

[11] Patent Number: 5,738,918

[45] Date of Patent: *Apr. 14, 1998

[54] LAMINATES OF LIQUID CRYSTALLINE POLYMERIC FILMS FOR POLARIZER APPLICATIONS

[75] Inventors: Sunny S. Shen, Holmdel; Hyun Nam Yoon, New Providence; Chia-Chi Teng, Piscataway, all of N.J.

[73] Assignee: Hoechst Celanese Corp, Somerville, N.J.

[ * ] Notice: The term of this patent shall not extend beyond the expiration date of Pat. No. 5,672,296.

[21] Appl. No.: 663,764

[22] Filed: Jun. 14, 1996

[51] Int. Cl.$^6$ ................................................. G02F 1/1335
[52] U.S. Cl. ...................................... 428/1; 349/96
[58] Field of Search ........................ 428/1; 359/63, 359/64, 65; 349/96

[56] References Cited

U.S. PATENT DOCUMENTS

| | | |
|---|---|---|
| 4,313,640 | 2/1982 | Trotman et al. . |
| 4,405,749 | 9/1983 | Nelsen . |
| 4,486,493 | 12/1984 | Burmester et al. . |
| 4,520,150 | 5/1985 | Golder . |
| 5,024,850 | 6/1991 | Broer et al. ................................. 428/1 |

FOREIGN PATENT DOCUMENTS

| | | | |
|---|---|---|---|
| 41 35 364 A1 | 4/1993 | Germany | ........................ A47C 7/18 |
| 295 05 981 U | 4/1995 | Germany | ........................ A47C 7/74 |
| 195602 | 8/1988 | Japan . | |

OTHER PUBLICATIONS

Patent Abstracts of Japan, vol. 018, No. 168 (M–1580), 22 Mar. 1994 & JP 05 337258 A (Toyobo Co. Ltd.), 21 Dec. 1993.

Patent Abstracts of Japan, vol. 018, No. 012 (C–1150), 11 Jan. 1994 & JP 05 247819 A (Toyobo Co. Ltd.), 24 Sep. 1993.

*Primary Examiner*—Alexander Thomas
*Attorney, Agent, or Firm*—Palaiyur S. Kalyanaraman

[57] ABSTRACT

This invention provides laminates useful for display device applications. An illustrative laminate comprises a polarizing film, and a protective layer, bonded by means of an intermediary adhesive layer. A polarizing film useful for such a laminate construction comprises a liquid crystalline polyester and a dichroic dye. The invention further provides a process to prepare such laminates.

28 Claims, No Drawings

5,738,918

LAMINATES OF LIQUID CRYSTALLINE POLYMERIC FILMS FOR POLARIZER APPLICATIONS

FIELD OF THE INVENTION

This invention relates to laminates containing polarizers which contain liquid crystal polymers and dichroic dyes. Such polarizer laminates are useful in liquid crystal display devices.

BACKGROUND OF THE INVENTION

Polarizers are important components of liquid crystal displays. Liquid crystal displays (LCDs) are widely used components in applications such as, for example, Notebook Personal Computers (PCs), calculators, watches, liquid crystal color TVs, word processors, automotive instrument panels, anti-glare glasses and the like. A useful review article, for example, is "Digital Displays" by in *Kirk-Othmer Encyclopedia of Chemical Technology*, Third edition, Volume 7, page 726 (1979), Wiley-Interscience Publication, John Wiley & Sons, New York. Typically, Polarizers are used in the form of film, the polarizer film (also called polarizing film). In an LCD, the liquid crystal elements are generally sandwiched between two layers of polarizing films.

A typical liquid crystal display contains three key elements: an input polarizer, a liquid crystal (LC) cell, and an output polarizer. There are glass substrates separating these three elements and providing support for the electrodes of the LC cell as well as containing the liquid crystal material. The polarizers are typically laminated onto the outside of these glass substrates. The input polarizer ensures that the light entering the LC cell is linearly polarized. The LC cell is designed to allow for a voltage controllable transformation of the input polarization to some other polarization at the output of the LC cell. This light then passes through the output polarizer (or analyzing polarizer). By controlling the polarization of the light passing through this output polarizer the LC cell can control the brightness of the display.

Other LC displays (such as reflective displays) operate with somewhat different optical paths, but the polarizers are still required to prepare the polarization of the light input to the LC cell and to allow the LC cell to vary display brightness by changing the polarization of the light passing through it.

To provide physical protection during LCD manufacturing and use the polarizer film is generally laminated. Lamination also helps prevent relaxation of dichroism. The type of materials used for the lamination as well as the process of preparing the laminate are generally critical in the performance of the LCD. In one common construction of the laminate, both sides of the polarizer film are laminated, thus giving rise to five individual layers: the polarizer film in the middle, flanked on either side by an adhesive layer which binds the polarizer film to a protective layer, such as, for example, polyethylene terephthalate (PET), polymethyl methacrylate (PMMA), triacetyl cellulose (CTA), and the like. This construction may further be coated with an adhesive layer, other supporting layers, and the like. The protective layer may also be bonded, via an adhesive, to a substrate.

Traditional polarizing films comprise a stretched polymer film such as, for example, polyvinyl alcohol (PVA), a dichroic absorber and other optional layers. The dichroic absorber is usually iodine or a dichroic dye that is absorbed in the polymer film. However, there are several disadvantages with such films that make them unsuitable for advanced and sophisticated applications. Some such disadvantages include, for example, non-uniformity, separation of the absorber over time, susceptibility to moisture and the like. For this reason, liquid crystalline polymer-based polarizers are being developed for polarizers. The process of molding or extrusion generally achieves a high degree of stable orientation in such polymers. For this reason, liquid crystal polymers would be ideal candidates for polarizer substrate film applications.

Pending U.S. patent application, Ser. No., 08/460,288, filed Jun. 2, 1995, now U.S. Pat. No. 5,672,296 discloses novel liquid crystalline polymer compositions useful in polarizer applications. Illustrative compositions disclosed therein are liquid crystalline polyesters which comprise repeat units corresponding to the formula:

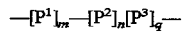

wherein $p_1$, $P^2$ and $P^3$ represent monomeric moieties with $P^1$ being an aromatic hydroxy carboxylic acid, $P^2$ being an aromatic dicarboxylic acid and $P^3$ being a phenol; and m, n and q represent mole percent of the respective monomers ranging from 0–70 mole percent individually. Additional monomers may also be present. A preferred composition is a film-forming wholly aromatic thermotropic liquid crystal polyester which comprises five monomeric moieties derived from 4-hydroxybenzoic acid, terephthalic acid, 4,4'-dihydroxybiphenyl, 6-hydroxy-2-naphthoic acid, and resorcinol in a molar ratio 30:20:10:30:10 respectively.

It is an object of this invention to provide superior laminates comprising liquid crystal polymers for polarizer applications.

It is an additional object of this invention to prepare laminates comprising liquid crystal polymers and dichroic dyes for polarizer applications.

It is a further object of this invention to provide laminates for polarizer applications, wherein the laminates comprise films of liquid crystal polymers containing absorbers that possess high dichroic ratio, polarizing efficiency, and high temperature and moisture stability.

Other objects and advantages of the present invention will be apparent from the accompanying description and examples.

SUMMARY OF THE INVENTION

One or more of the foregoing objects are achieved by the provision of laminates comprising polarizing films which films comprise suitable liquid crystalline polymers and suitable dichroic absorbers. Such polarizing films containing suitable liquid crystalline polymers and dichroic absorbers are disclosed in pending patent application, Ser. No. 08/460, 288, filed Jun. 2, 1995. Polarizing films disclosed therein comprise a blend of (a) a film-forming, thermotropic liquid crystalline polymer ("LCP"), and (b) a suitable dichroic absorber, which includes materials such as iodine as well as dichroic dyes; preferred are the dichroic dyes. The LCP may be a polyester, polyamide, polyesteramide, polyketone, polycarbonate, polyurethane, polyether and the like. A preferred LCP is a polyester or a polyesteramide. An illustrative liquid crystalline polymer disclosed in that pending application and useful in preparing the inventive laminates comprises repeat units corresponding to the formula:

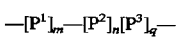

wherein $P^1$ is an aromatic hydroxy monocarboxylic acid or an aromatic amino carboxylic acid; $P^2$ is an aromatic dicarboxylic acid; $P^3$ is a phenolic compound; m, n and q represent mole percent of the respective monomers. While m, n, and q may generally range from 5–70% individually, the preferred range of m is about 5–40%, n is about 5–40% and q is about 5–30%. In addition to $P^1$, $P^2$ and $P^3$, additional monomeric moieties such as, for example, a second aromatic amino carboxylic acid moiety or an aromatic hydroxy carboxylic acid moiety —$[P^4]_r$—, a diphenol moiety —$[P^5]_s$, and the like, may be part of the polymer repeat unit, in which case r is about 5–20 mole %, and s is about 5–20 mole %. $P^4$ is different from $P^1$ and $P^5$ is different from $P^3$. Laminates prepared using such polarizing films, along with suitable adhesives and any other suitable optional supporting and protecting layers offer superior advantages for polarizer applications, and LCDs.

The present invention further provides a process to make such laminates.

DESCRIPTION OF THE PREFERRED EMBODIMENTS

In one embodiment, the present invention discloses laminates comprising liquid crystalline polymeric polarizing films which possess high optical clarity, dichroic ratio, polarizing efficiency, and humidity/heat resistance. The term "high optical clarity" refers to glassy property and is measured by light transmission of at least 30% in the useful wavelength range for the display. The term "high dichroic ratio" refers to a ratio of at least 8. The term "high humidity/heat resistance" refers to no substantial change in the optical and physical properties of the film when the film is exposed to environmental conditions of about 90% humidity and temperatures of about 90° C. for about 100 hours. Polarizing efficiency (P.E.) of dye-based polarizer films has been defined in copending patent application, Ser. No. 08/459,581, filed Jun. 2, 1995, now U.S. Pat. No. 5,667,719 by the following formula:

$$P.E. = \frac{T_\perp - T_\parallel}{T_\perp + T_\parallel}$$

where the transmissions ($T_\perp$, $T_\parallel$) of transverse and parallel polarization with respect to the draw direction are related to polarizers through the following formulas:

$$T_i = T_0 \cdot 10^{-A_i},$$

i=⊥ or //, $T_0$ is the Fresnel reflection factor.

$$A_\parallel = cd \cdot (\epsilon_\parallel <\cos^2 \theta> + \epsilon_\perp <\sin^2 \theta>)$$

$$A_{\perp 95} = \frac{1}{2} cd \cdot (\epsilon_\parallel <\sin^2 \theta> + \epsilon_\perp (1+<\cos^2 \theta>))$$

where c is the concentration of dye in the film.
d, the film thickness
θ, the angle between dye and film draw axes
<> implies the orientation average and
ϵ, components of the molecular absorptivity tensor of the dye, i.e., $$\epsilon = \begin{bmatrix} \epsilon_\perp & 0 & 0 \\ \epsilon_\perp & \epsilon_\perp & 0 \\ 0 & 0 & \epsilon_\parallel \end{bmatrix}$$

The laminates constructed according to the present invention possess good mechanical stability, thermal stability and optical clarity. Such advantageous properties are achieved by selection of the suitable LOP-based polarizing films, suitable adhesives and the lamination process disclosed in the invention.

As stated earlier, the general construction of laminates includes various layers such as the polarizing layer, adhesive layers, protective layers, supporting layers, and the like. Some of these categories are described below.

The polarizing layer comprises liquid crystalline polymer (LCP) and dichroic absorber. LCPs are well known in the art, and any suitable LCP may be used in the practice of the invention, provided the resulting polarizing film has the properties described above. The LCP may be a polyester, polyamide, polycarbonate, poly(ester-carbonate), polyaramide, poly(ester-amide), and the like. Preferred are liquid crystalline polyesters. Several liquid crystalline polyesters are known in the art, such as, for example, the Vectra® brand resins supplied by Hoechst Celanese Corporation, Somerville, N.J. Preferred LCPs are those disclosed in copending patent application, Ser. No. 08/460,288, cited earlier. Especially preferred LCPs are those liquid crystalline polyesters corresponding to the general formula:

—$[P^1]_m$—$[P^2]_n$—$[P^3]_q$—$[P^4]_r$—$[P^5]_s$— wherein $P^1$ is an aromatic hydroxy monocarboxylic acid or an aromatic amino carboxylic acid; $P^2$ is an aromatic dicarboxylic acid; $P^3$ is a phenolic compound; $P^4$ is a second aromatic amino carboxylic acid moiety or an aromatic hydroxy carboxylic acid moiety which is different from $P^1$; $P^5$ is a second diphenol moiety different from $P^3$; m, n, q, r and s represent mole percent of the respective monomers. The quantities m, n, and q may generally range from 5–70% individually, while r and s are in the range 5–50 mole %. the preferred range of m is about 5–40%, n is about 5–40% and q is about 5–30%. Examples of $P^1$ include, but are not limited to, monomers such as, for example, 4-hydroxybenzoic acid, 6-hydroxy-2-naphthoic acid, 4-aminobenzoic acid and 4-carboxy-4'-hydroxy-1,1'-biphenyl. Examples of $P^2$ include, but are not limited to, monomers such as, for example, terephthalic acid, isophthalic acid, phthalic acid, 2-phenylterephthalic acid, 1,2-naphthalene dicarboxylic acid, 1,4-naphthalene dicarboxylic acid, 2,6-naphthalene dicarboxylic acid and 4,4'-biphenyl dicarboxylic acid. Examples of $P^3$ include, but are not limited to, hydroquinone, resorcinol, methyl hydroquinone, phenyl hydroquinone, catechol, 4,4'-dihydroxy biphenyl, and acetaminophen. Examples of $P^4$, which is different from $P^1$, include, but are not limited to, 4-hydroxybenzoic acid, 6-hydroxy-2-naphthoic acid, 4-aminobenzoic acid and 4-carboxy-4'hydroxy-1,1'-biphenyl. Examples of $P^5$, which is different from $P^3$, include, but are not limited to, hydroquinone, methyl hydroquinone, phenyl hydroquinone, catechol, 4,4'-dihydroxy biphenyl, resorcinol and acetaminophen. An illustrative composition is the LCP, hereinafter referred to as "COTBPR", prepared from the monomers 4-hydroxybenzoic acid ("HBA") for $P^1$, terephthalic acid ("TA") for $P^2$, 4,4'-biphenol ("BP") for $P^3$, 6-hydroxy-2-naphthoic acid ("H NA") for $P^4$, and resorcinol ("R") for $P^5$ in its repeat unit in the ratio 30:20:10:30:10 respectively.

The dichroic absorber may be materials such as, for example, iodine, or preferably organic dichroic dyes. Suitable dichroic dyes include, but are not limited to, straight chain dyes, branched dyes, direct dyes, disperse dyes, acidic dyes and the like. Yellow, orange, blue, purple or red dyes are all suitable. Several classes of suitable dyes are well known to those skilled in the art. They include, but are not limited to azo dyes, anthraquinone dyes, commercially available Disperse dyes such as Blue 214, Red 60 and Yellow 56, direct dyes such as Black 17, 19 and 154, Brown 44, 106, 195, 210, 242 and 247, Blue 1, 15, 22, 78, 90, 98, 151, 168, 202, 236, 249, and 270, Violet 9, 12, 51, and 98, Green 1 and 85, Yellow 8, 12, 44, 86, and 87, Orange 26, 39, 106 and 107, and Methylene violet Bernthsen (available from Aldrich Chemical Company, Milwaukee, Wis.). More than one compatible dyes may also be used, if so desired, as well as a combination of iodine and one or more dichroic dyes. The choice of suitable dichroic dye or dyes depends on several factors, as is well known to those skilled in the art. Some such factors include, but are not limited to, light fastness and migration in the polymer. Another desirable property is that the transition moment of the dye is aligned with the main axis.

The dye may be blended with the LCP to form the polarizing film, or the dye may form part of the polymer backbone main chain of the LCP; some examples of LCPs with dyes in their backbones are disclosed in pending patent application, Ser. No. 08/561,607, filed Nov. 21, 1995. If it is a blend, the LCP and the dye may preferably be melt-blended. Melt blending of LCP and dye and extrusion to form polarizing film is disclosed in pending patent application, Ser. No. 08/460,288, referred to above.

The adhesive layer may be applied on one or both sides of the polarizing film, preferably on both. Or, it may be applied to the protective layer which is then laminated to the polarizing film. The same adhesive or different adhesives may be used on the two sides; use of the same adhesive is preferred. The adhesive may be applied by suitable processes which are well known to those skilled in the art, for example, direct application, coating from a solution, extrusion, and the like. The adhesive may be the thermally curing type, radiation curing type, pressure sensitive type, x-ray curing, electron-beam curing, and the like. Several useful adhesives for constructing the laminate are available commercially, such as, for example, acrylic adhesives, acrylic urethane-based adhesives, and the like. Some of them are, for example, Z-FLEX® (obtained from Courtaulds Performance Films, Fieldale, Va.), DEV8154® (also called ARclad®; obtained from Adhesives Research, Incorporated, Glen Rock, Pa.), UV10LVDC® (obtained from Master Bond, Inc., Hackensack, N.J.), LTX125X® and LTX119® (obtained from Master Bond, Inc., Teaneck, N.J.) and 95C21® and 95C22® (obtained from Sony Chemical Corporation, Tochigi-Prefecture, Japan).

Materials for the protective layer which goes on the adhesive layer are known in the art. Examples are glasses, ceramics as well as plastics such as, for example, polyethylene terephthalate (PET), polymethyl methacrylate (PMMA), triacetyl cellulose (CTA), and the like. Other materials such as, for example, polycarbonates, polybenzimidazles, polybenzimidazolones, polybenzoxazoles, polybenzthiazoles, nylons, polyvinyl chlorides, wholly aromatic polyesters, polyarylates, polyamides, polyaramides, polyimides, poly(amide-imides), poly(ester-carbonates), poly(ester-amides), cycloolefin polymers, cycloolefin copolymers ("COCs") and the like may also be used. COCs have the advantage of high clarity and high Tg, and are thus highly useful. High Tg helps in the application of the polarizer device in harsh environments.

As mentioned earlier, other optional layers may also be included in the laminate. Thus, for example, in one construction of an LCD, the above-noted protective layer/ adhesive/LCP polarizing film/adhesive/protective layer laminate may be bonded further to a substrate such as glass, plastic, ceramic and the like, by applying an adhesive to the protective layer and then bringing the substrate in contact.

The adhesive may be the pressure-sensitive type, for example. With protective layer, the final structure may be, for example, glass/adhesive/protective layer/adhesive/LCP polarizing film/adhesive/protective layer. Other constructions are possible provided the polarizer film does not require handling or environmental protection during LCD manufacturing steps and in use. For Example, a protective layer may be used on only one side of the polarizer and the other bonded directly to the glass of the LCD cell. This would offer protection from physical damage of the polarizer during LCD use, and is particularly suitable for LCP based polarizer films, which offer excellent stability at high temperatures and humidity. Other advantages of this construction include fewer layers and lower thickness. Yet another construction may be suitable for LCP polarizer films placed inside the LCD glass substrate. A laminate of only LCP polarizer film and adhesive may be attached to the inside of the glass, and subsequent manufacturing steps performed directly on the LCP polarizer. The excellent chemical and dimensional stabilities of LCP would permit this approach, provided the process temperatures for LCD construction were below the LCP polarizer film process conditions. Other laminate structures are also possible, as may be obvious to those skilled in the requirements of polarizer films for LCD's.

There may also be hard coat layers, anti-reflection coatings, anti-glare layers, birefringent phase-compensation layers and the like. There may also be transparent conducting coatings such as indium-tin-oxide ("ITO") which are directly coated by suitable processes such as vacuum deposition and the like. There may also be metal reflectors, transflectors, and the like, as part of the laminate, with or without an adhesive. An example would be metal/LCP polarizing film/adhesive/protective layer/adhesive layer/ substrate.

Another embodiment of the invention is the process of preparing the laminates. The process generally includes stages such as, for example, curing, and testing for properties such as mechanical stability, environmental stability, and optical clarity. The curing stage involves the preparation of the lamination, and the curing conditions depend on the type of the adhesive—whether it is thermal curing, UV curing, e-beam curing, and the like. Prior to lamination, the surface of the LCP-based polarizing film may be suitably treated such as, for example, corona plasma, if necessary, to improve its adhesion. Lamination samples comprising the LCP-based polarizing film, adhesive layer and the supporting layer may be assembled, in the order desired, and the curing conditions such as, for example, temperature, pressure and the like, may be applied to the samples by use of equipments such as, for example, hydraulic press, oven, light (UV, for example) and the like. Vacuum may be used during the curing process to reduce or eliminate any problems with air bubbles. Once the curing conditions are applied, a certain amount of time is generally allowed for the adhesive to completely bond the layers. The completion of the lamination may be tested by observing the physical appearance before and after. Successful completion of the curing stage depends on the properties of the adhesive.

The testing for mechanical stability involves the testing of the bond strength (peel strength) between the adhesive and the LCP film after the lamination is cured. The stronger the bond between the adhesive and the LCP film, the better the mechanical stability of the adhesive. Testing methods for the peel strength are well known in the art, such as, for example, the ASTM D1876 procedure published by the American Society for Testing Materials, Philadelphia, Pa. Peel strengths may be tested before and after environmental testing of the laminate under conditions that are generally used for testing polarizer films. Such testing conditions generally involve exposure of the laminate to an elevated temperature and humidity for a specific number of days in order to observe any physical changes in the appearance of the lamination. The longer the lamination is able to withstand the elevated temperature and humidity without detrimental change, the greater is its environmental stability.

The invention may be illustrated by the following description, wherein ARclad DEV8154® was used as the adhesive and CTA and COC were used as supporting layers. The lamination assembly was subjected to curing as described in EXAMPLES section below. The adhesive being a pressure-sensitive adhesive achieved full curing through the use of a hydraulic hot press. The lamination samples cured with the adhesive were then subjected to peel strength testing to determine their bond strength. The cured laminates were then placed into an environmental chamber and exposed to a temperature of about 90° C. and a relative humidity of about 90 percent. These laminates remained in the chamber for a specified number of days in order to observe any physical changes in their appearance and effects on adhesive performance, and tested at several intervals for their peel strength. The testing intervals are one, four, seven, and fourteen days. Results showed excellent adhesion.

The following EXAMPLES are provided to further illustrate the present invention, but the invention is not to be construed as being limited thereto.

EXAMPLES

The LCPs and LCP-based polarizing films used in these EXAMPLES are from Hoechst Celanese Corporation, as well as those disclosed in the copending patent application, Ser. No. 08/460,288, referred to earlier.

Example 1

Illustration of preparing the Laminate

The LCP in this Example was Vectran A910® from Hoechst Celanese. The supporting films were either CTA (obtained from Catalina Plastics, Las Vegas, Nev.) or COC from Hoechst Celanese. The adhesive was ARclad DEV8154®. The LCP films and the substrates were corona treated prior to the application of the adhesive. The supporting film was then placed on the adhesive. Each laminate sample was then placed into a vacuum bag and then the entire assembly was put into a hot press at 50° C. The following table lists the curing conditions and the resulting peel strengths.

TABLE 1

Peel Strength Results at Various Curing Pressures
Lamination sample size: 2" × 4"
Peel Strength results were measured according to ASTM D1876
and are in units of lbs/in.

| Curing Time | Curing Pressure | | | | | |
|---|---|---|---|---|---|---|
| | 300 psi | | 200 psi | | 100 psi | |
| (min) | CTA | COC | CTA | COC | CTA | COC |
| 30 | 4.71 | 4.73 | 6.33 | 3.49 | 4.2 | 5.84 |
| 15 | 8.66 | 3.27 | 7.37 | 2.87 | 4.05 | 3.77 |
| 10 | 10.1 | 1.56 | 7.23 | 3.53 | 7.63 | 1.4 |
| 5 | 6.12 | 1.82 | 5.58 | 2.88 | 8.2 | 1.68 |
| 2.5 | 8.08 | 5.3 | 4.26 | 4.53 | 6.91 | 2.2 |

In a similar manner, laminates were prepared using a dyed LCP film as the polarizer. The LCP was described as COTBPR in copending application, Ser. No. 08/460,288, cited earlier, and comprised repeat units from the monomers 4-hydroxybenzoic acid, terephthalic acid, 4,4'-biphenol, 6-hydroxy-2-naphthoic acid, and resorcinol in the ratio 30:20:10:30:10 respectively. The prepared laminates had either CTA or COC as the protective layer which were then subjected to environmental test in order to test the humidity/heat resistance of the laminates. The peel strength was measured after regular intervals of time in the environmental chamber. Thus, the peel strength was determined at 0 time in the chamber, and then after intervals of 1, 4, 7 and 14 days in the chamber. Consistently maintained peel strength without deterioration indicates better adhesion in the laminate and better humidity/heat resistance of the laminates. The results are summarized in Table 2:

TABLE 2

Peel Strengths Under Environmental Test

| | Peel Strength | |
|---|---|---|
| Time (days) | CTA | COC |
| 0 | 9.24 | 1.88 |
| 1 | 6.19 | 2.00 |
| 4 | 0.49 | 1.05 |
| 7 | 0.18 | 0.72 |
| 14 | 0.22 | 1.72 |

The results demonstrate that the laminates constructed according to the present invention possessed high humidity/heat resistance.

What is claimed is:

1. A laminate comprising: (a) a polarizing film; (b) one or more adhesive layers; and (c) one or more supporting layers, wherein said polarizing film comprises a blend of (a) a film-forming, thermotropic liquid crystalline polyester and (b) a dichroic absorber, wherein said polyester comprises repeat units corresponding to the formula:

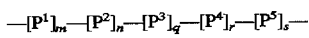

$$-[P^1]_m-[P^2]_n-[P^3]_q-[P^4]_r-[P^5]_s-$$

wherein $P^1$, $P^2$, $P^3$, $P^4$ and $P^5$ represent monomeric moieties, with $P^1$ being an aromatic hydroxy carboxylic acid, $P^2$ being an aromatic dicarboxylic acid, $P^3$ being a phenol, $P^4$ being a second aromatic hydroxy carboxylic acid moiety different from $P^1$, and $P^5$ being a second phenolic moiety different from $P^3$, and m, n, q, r and s represent mole percent of the respective monomers individually with $P^1$ and $P^2$ in the range 5–40 mole percent, $P^3$ in the range 5–30 mole percent, and $P^4$ and $P^5$ in the range 5–20 mole percent.

2. The laminate of claim 1, wherein $P^1$ is selected from the group consisting of 4-hydroxybenzoic acid, 6-hydroxy-2-naphthoic acid, and 4-carboxy-4'-hydroxy-1,1'-biphenyl.

3. The laminate of claim 2, wherein said $P^1$ is 4-hydroxybenzoic acid.

4. The laminate of claim 1, wherein $P^2$ is selected from the group consisting of terephthalic acid, isophthalic acid, phthalic acid, 2-phenylterephthalic acid, 1,2-naphthalenedicarboxylic acid, 1,4-naphthalenedicarboxylic acid, 2,6-naphthalene dicarboxylic acid and 4,4'-biphenyldicarboxylic acid.

5. The laminate of claim 4, wherein said $P^2$ is terephthalic acid.

6. The laminate of claim 1, wherein $P^3$ is selected from the group consisting of resorcinol, hydroquinone, methyl hydroquinone, phenyl hydroquinone, catechol, 4,4'-dihydroxybiphenyl and acetaminophen.

7. The laminate of claim 6, wherein said $P^3$ is 4,4'-dihydroxybiphenyl.

8. The laminate of claim 1, wherein said $P^4$ is selected from the group consisting of 4-hydroxybenzoic acid, 6-hydroxy-2-naphthoic acid, and 4-carboxy-4'-hydroxy-1,1'-biphenyl.

9. The laminate of claim 8, wherein said $P^4$ is 6-hydroxy-2-naphthoic acid.

10. The laminate of claim 1, wherein said $P^5$ is selected from resorcinol, hydroquinone, catechol, 4,4'-dihydroxybiphenyl, bisphenol-A and acetaminophen.

11. The laminate of claim 10, wherein said $P^5$ is resorcinol.

12. The laminate of claim 1, wherein said dichroic absorber is an inorganic material or an organic dichroic dye.

13. The laminate of claim 12, wherein said organic dichroic dye is selected from the group consisting of straight chain dye, branched dye, direct dye, disperse dye, solvent dye and acidic dye.

14. The laminate of claim 1, wherein said adhesive is selected from the group consisting of thermally curing adhesive, radiation curing adhesive, pressure-sensitive adhesive and mixtures thereof.

15. The laminate of claim 1, wherein said adhesive is an acrylic adhesive.

16. The laminate of claim 1, wherein said supporting layer is selected from the group consisting of polymethyl methacrylate, polycarbonate, polyethylene terephthalate, cellulose triacetate, cycloolefin copolymer and mixtures thereof.

17. The laminate of claim 16, wherein said supporting layer is cellulose triacetate.

18. The laminate of claim 16, wherein said supporting layer is a cycloolefin copolymer.

19. A liquid crystal display device comprising said laminate of claim 1.

20. A laminate for display applications, comprising a plurality of layers wherein a first layer comprises a blend of a film-forming, thermotropic liquid crystalline polyester and a dichroic absorber, and wherein at least one second layer comprises an adhesive, and further wherein at least one third layer comprises a supporting substrate selected from the group consisting of glass, polymethyl methacrylate, polyethylene terephthalate, polycarbonate, cycloolefin copolymer and cellulose triacetate, and still further wherein said polyester comprises repeat units corresponding to the formula:

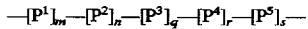

wherein $P^1$, $P^2$, $P^3$, $P^4$ and $P^5$ represent monomeric moieties, with $P^1$ being an aromatic hydroxy carboxylic acid, $P^2$ being an aromatic dicarboxylic acid, $P^3$ being a phenol, $P^4$ being a second aromatic hydroxy carboxylic acid moiety different from $P^1$, and $P^5$ being a second phenolic moiety different from $P^3$, and m, n, q, r and s represent mole percent of the respective monomers individually with $P^1$ and $P^2$ in the range 5–40 mole percent, $P^3$ in the range 5–30 mole percent, and $P^4$ and $P^5$ in the range 5–20 mole percent.

21. The laminate as described in claim 20, wherein said polyester comprises, in its repeat units, residues of 4-hydroxybenzoic acid, terephthalic acid, resorcinol, 4,4'-biphenol and 6-hydroxy-2-naphthoic acid.

22. The laminate as described in claim 20, further comprising one or more layers selected from the group consisting of glass, ceramic, plastic, anti-reflection layer, anti-glare layer, hard coat, reflective layer, transflective layer, conducting layer, and birefringent phase-compensation layer.

23. The laminate as described in claim 22, wherein said conducting layer is indium-tin-oxide.

24. A laminate for display applications, comprising the structure protective layer/adhesive/polarizing film/adhesive/protective layer in that order, wherein said polarizing film comprises a blend of (a) a film-forming, thermotropic liquid crystalline polyester and (b) a dichroic absorber, wherein said polyester comprises repeat units corresponding to the formula:

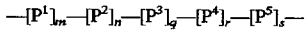

wherein $P^1$, $P^2$, $P^3$, $P^4$ and $P^5$ represent monomeric moieties, with $P^1$ being an aromatic hydroxy carboxylic acid, $P^2$ being an aromatic dicarboxylic acid, $P^3$ being a phenol, $P^4$ being a second aromatic hydroxy carboxylic acid moiety different from $P^1$, and $P^5$ being a second phenolic moiety different from $P^3$, and m, n, q, r and s represent mole percent of the respective monomers individually with $P^1$ and $P^2$ in the range 5–40 mole percent, $P^3$ in the range 5–30 mole percent, and $P^4$ and $P^5$ in the range 5–20 mole percent.

25. A laminate for display applications, comprising the structure glass/adhesive/protective layer/adhesive/polarizing film/adhesive/protective layer in that order, wherein said polarizing film comprises a blend of (a) a film-forming, thermotropic liquid crystalline polyester and (b) a dichroic absorber, wherein said polyester comprises repeat units corresponding to the formula:

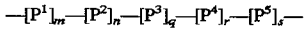

wherein $P^1$, $P^2$, $P^3$, $P^4$ and $P^5$ represent monomeric moieties, with $P^1$ being an aromatic hydroxy carboxylic acid, $P^2$ being an aromatic dicarboxylic acid, $P^3$ being a phenol, $P^4$ being a second aromatic hydroxy carboxylic acid moiety different from $P^1$, and $P^5$ being a second phenolic moiety different from $P^3$, and m, n, q, r and s represent mole percent of the respective monomers individually with $P^1$ and $P^2$ in the range 5–40 mole percent, $P^3$ in the range 5–30 mole percent, and $P^4$ and $P^5$ in the range 5–20 mole percent.

26. A laminate for display applications, comprising the structure glass/adhesive/polarizing film/adhesive/protective layer in that order, wherein said polarizing film comprises a liquid crystalline polyester and a colorant, further wherein said polyester comprises repeat units corresponding to the formula:

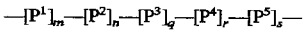

wherein $P^1$, $P^2$, $P^3$, $P^4$ and $P^5$ represent monomeric moieties, with $P^1$ being an aromatic hydroxy carboxylic acid, $P^2$ being an aromatic dicarboxylic acid, $P^3$ being a phenol, $P^4$ being a second aromatic hydroxy carboxylic acid moiety different from $P^1$, and $P^5$ being a second phenolic moiety different from $P^3$, and m, n, q, r and s represent mole percent of the respective monomers individually with $P^1$ and $P^2$ in the range 5–40 mole percent, $P^3$ in the range 5–30 mole percent, and $P^4$ and $P^5$ in the range 5–20 mole percent.

27. A liquid crystal display device comprising a laminate which comprises the structure glass/adhesive/polarizing film in that order wherein said device resides at the polarizing film side of said structure, further wherein said polarizing film comprises a blend of (a) a film-forming, thermotropic liquid crystalline polyester and (b) a dichroic absorber, still further wherein said polyester comprises repeat units corresponding to the formula:

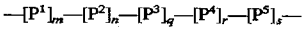

wherein $P^1$, $P^2$, $P^3$, $P^4$ and $P^5$ represent monomeric moieties, with $P^1$ being an aromatic hydroxy carboxylic acid, $P^2$ being an aromatic dicarboxylic acid, $P^3$ being a phenol, $P^4$ being a second aromatic hydroxy carboxylic acid moiety different from $P^1$, and $P^5$ being a second phenolic moiety different from $P^3$, and m, n, q, r and s represent mole percent of the respective monomers individually with $P^1$ and $P^2$ in the range 5–40 mole percent, $P^3$ in the range 5–30 mole percent, and $P^4$ and $P^5$ in the range 5–20 mole percent.

28. A process to prepare a laminate comprising: (a) preparing a polarizing film which film comprises a blend of a liquid crystalline polyester and a dichroic absorber; (b) adhering said polarizing film to one or more supporting layers utilizing one or more intermediary adhesive layers, wherein said liquid crystalline polyester is characterized by repeat units corresponding to the formula:

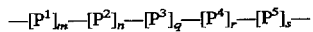

wherein $P^1, P^2, P^3, P^4$ and $P^5$ represent monomeric moieties, with $P^1$ being an aromatic hydroxy carboxylic acid, $P^2$ being an aromatic dicarboxylic acid, $P^3$ being a phenol, $P^4$ being a second aromatic hydroxy carboxylic acid moiety different from $P^1$, and $P^5$ being a second phenolic moiety different from $P^3$, and m, n, q, r and s represent mole percent of the respective monomers individually with $P^1$ and $P^2$ in the range 5–40 mole percent, $P^3$ in the range 5–30 mole percent, and $P^4$ and $P^5$ in the range 5–20 mole percent.

* * * * *